United States Patent
Koik et al.

(10) Patent No.: US 10,137,549 B2
(45) Date of Patent: Nov. 27, 2018

(54) MILLING CUTTER WITH LUBRICATION CONDUITS

(71) Applicant: sp3 Cutting Tools, Inc., Decatur, IN (US)

(72) Inventors: Erik Koik, Urbana, OH (US); Kirk Bennett, Tipp City, OH (US); Lori Munding, Fort Wayne, IN (US)

(73) Assignee: DECATUR DIAMOND, LLC, Decatur, IN (US)

( * ) Notice: Subject to any disclaimer, the term of this patent is extended or adjusted under 35 U.S.C. 154(b) by 245 days.

(21) Appl. No.: 15/094,450

(22) Filed: Apr. 8, 2016

(65) Prior Publication Data

US 2016/0297042 A1    Oct. 13, 2016

Related U.S. Application Data

(60) Provisional application No. 62/144,557, filed on Apr. 8, 2015.

(51) Int. Cl.
  *B23C 5/28* (2006.01)
  *B23Q 11/10* (2006.01)

(52) U.S. Cl.
  CPC ............ *B23Q 11/1046* (2013.01); *B23C 5/28* (2013.01); *B23C 2250/12* (2013.01); *B23Q 11/10* (2013.01); *B23Q 11/1015* (2013.01); *B23Q 11/1023* (2013.01)

(58) Field of Classification Search
  CPC . B23Q 11/1023; B23Q 11/10; B23Q 11/1046; B23Q 11/1015; B23D 59/025; B23C 2240/245; B23C 2250/12; B23C 5/006; B23C 5/28; B23B 2240/24
  See application file for complete search history.

(56) References Cited

U.S. PATENT DOCUMENTS

| | | | | |
|---|---|---|---|---|
| 960,526 | A * | 6/1910 | Erlandsen | B23B 27/10 144/230 |
| 2,807,443 | A * | 9/1957 | Wyman | E21B 10/38 175/393 |
| 4,302,135 | A * | 11/1981 | Lillie | B23B 27/1614 407/11 |
| 4,322,189 | A * | 3/1982 | Briese | B23Q 1/0036 407/11 |

(Continued)

FOREIGN PATENT DOCUMENTS

| | | | | |
|---|---|---|---|---|
| JP | 02269513 | A * | 11/1990 | ......... B23Q 11/0032 |
| JP | 2009061583 | A * | 3/2009 | ............. B23B 31/20 |
| WO | WO 2010128930 | A1 * | 11/2010 | ............... B23C 5/08 |

*Primary Examiner* — Sara Addisu
(74) *Attorney, Agent, or Firm* — Shumaker, Loop & Kendrick, LLP; James D. Miller

(57) ABSTRACT

A lubricant distribution device configured to be coupled to a rotating cutting tool having a plurality of circumferentially spaced cutting surfaces comprises a main body having a manifold conduit extending along a central rotational axis of the main body and a plurality of lubricant distributing conduits formed in the main body and extending radially outwardly from the manifold conduit. Each of the lubricant distributing conduits is configured to convey a lubricant therethrough and includes an inlet fluidly coupling each of the lubricant distributing conduits to the manifold conduit and an outlet disposed adjacent a corresponding one of the circumferentially spaced cutting surfaces of the cutting tool.

19 Claims, 2 Drawing Sheets

(56) References Cited

U.S. PATENT DOCUMENTS

| | | | | |
|---|---|---|---|---|
| 4,333,371 A * | 6/1982 | Matsuda | ............... | B23D 59/025<br>83/169 |
| 4,541,758 A * | 9/1985 | Frank | ................... | B23D 59/025<br>125/20 |
| 4,610,579 A * | 9/1986 | Frank | ................... | B23D 59/025<br>125/20 |
| 4,929,131 A * | 5/1990 | Allemann | ........... | B23B 31/1075<br>279/8 |
| 5,290,135 A * | 3/1994 | Ball | ........................ | B23F 21/22<br>407/11 |
| 5,423,717 A * | 6/1995 | Boaz | ........................ | B24B 9/10<br>451/449 |
| 7,673,706 B2 * | 3/2010 | Simmons | ................... | E21B 7/28<br>175/389 |
| 7,802,947 B2 * | 9/2010 | Endres | ..................... | B23B 27/10<br>407/113 |
| 9,266,174 B2 | 2/2016 | Koik et al. | | |
| 9,623,497 B2 * | 4/2017 | Dudzinsky | ................ | B23C 5/28 |
| 9,676,043 B2 * | 6/2017 | Lehto | ......................... | B23C 5/28 |
| 9,833,846 B2 * | 12/2017 | Waggle | ..................... | B23C 5/28 |
| 2002/0009339 A1 * | 1/2002 | Arvidsson | ............... | B23C 5/006<br>407/35 |
| 2002/0106251 A1 * | 8/2002 | Ripley | ...................... | B23C 5/28<br>407/35 |
| 2004/0042858 A1 * | 3/2004 | Sheffler | ................... | B23C 5/006<br>407/11 |
| 2004/0131434 A1 * | 7/2004 | Giessler | ................. | B23G 5/005<br>408/59 |
| 2007/0127992 A1 * | 6/2007 | Spichtinger | ............. | B23C 5/006<br>407/39 |
| 2007/0231097 A1 * | 10/2007 | Ballas | ....................... | B23C 5/06<br>409/136 |
| 2007/0237588 A1 * | 10/2007 | Russell | ..................... | B23C 5/28<br>407/11 |
| 2008/0175676 A1 * | 7/2008 | Prichard | ................ | B23C 5/2221<br>407/11 |
| 2008/0175679 A1 * | 7/2008 | Prichard | ................. | B23C 5/109<br>407/42 |
| 2009/0226268 A1 * | 9/2009 | Pilkington | ................ | B23C 5/28<br>407/113 |
| 2011/0217131 A1 * | 9/2011 | Bonnarang | ............... | B23C 5/28<br>407/11 |
| 2011/0250827 A1 * | 10/2011 | Smith | ................... | B23D 59/025<br>451/449 |
| 2011/0262234 A1 * | 10/2011 | Schuffenhauer | ..... | B23D 77/006<br>408/56 |
| 2012/0141220 A1 * | 6/2012 | Chen | ....................... | B23B 31/11<br>409/136 |
| 2012/0230781 A1 * | 9/2012 | Hoffer | ....................... | B23C 5/28<br>407/11 |
| 2012/0275876 A1 * | 11/2012 | Lehto | ........................ | B23C 5/26<br>409/137 |
| 2013/0045059 A1 * | 2/2013 | Bozkurt | ..................... | B23C 5/06<br>409/131 |
| 2014/0321927 A1 * | 10/2014 | Craig | ...................... | B23B 27/10<br>407/11 |
| 2015/0078851 A1 * | 3/2015 | Liepelt | .................... | B23F 5/163<br>409/38 |
| 2015/0290726 A1 * | 10/2015 | Lehto | ........................ | B23C 5/28<br>407/11 |
| 2015/0298225 A1 * | 10/2015 | Ueno | ........................ | B23C 3/00<br>244/129.1 |
| 2015/0328698 A1 * | 11/2015 | Otani | ....................... | B23C 5/265<br>409/136 |
| 2016/0039016 A1 * | 2/2016 | Waggle | ...................... | B23C 5/28<br>407/11 |
| 2016/0074948 A1 * | 3/2016 | Dudzinsky | ................ | B23C 5/28<br>407/11 |
| 2016/0107284 A1 * | 4/2016 | Haimer | ................... | B23B 31/11<br>407/11 |
| 2017/0252839 A1 * | 9/2017 | Donisi | ....................... | B23C 5/28 |
| 2017/0304977 A1 * | 10/2017 | Habel | ..................... | B23P 13/02 |

* cited by examiner

MILLING CUTTER WITH LUBRICATION CONDUITS

CROSS-REFERENCE TO RELATED APPLICATION

This application claims priority to U.S. Provisional Application Ser. No. 62/144,557, filed Apr. 8, 2015, the entire disclosure of which is hereby incorporated herein by reference.

FIELD OF THE INVENTION

The present invention relates to a minimum quantity lubrication cutting tool, and more specifically to an MQL cutting tool having fluid conduits for delivering a lubricating aerosol to each cutting surface of the cutting tool.

BACKGROUND OF THE INVENTION

Many traditional machining processes utilize a "wet machining" process that requires the application of a large quantity of lubricating coolant to an interface between a cutting tool and a workpiece during a machining process. Such machining processes may include milling, drilling, tapping, and finish machining, for example. The lubricating coolant used may be water or oil-based, and such machining processes may require the delivery of several gallons per hour of the lubricating coolant to the cutting edge of the cutting tool to maintain a thermal stability of the machine tooling and the workpiece. The wet machining process may also be used to desirably relocate chips that are removed from the workpiece as a result of the machining process.

However, use of traditional wet machining processes can be problematic due to the additional expense required to maintain a system utilizing such large quantities of lubricating coolant. For instance, it has been estimated that the costs associated with the use of a suitable lubricating coolant in a wet machining process can be as much as 15% or more of the life-cycle operational cost of the machining process. These costs may include the expenses associated with procuring, filtering, or separating the lubricating coolant, as well as expenses related to keeping records and disposing of the lubricating coolant in accordance with any applicable rules or regulations related to the use of such coolants.

Wet machining processes also present additional safety and health concerns for those who operate such systems. Traditional wet machining often results in the formation of a coolant mist that may interact with the remainder of the work shop where the wet machining is being performed. The coolant mist may present health concerns due to its toxicity and the generation of bacteria or fungi associated with the coolant.

One solution to the problems associated with wet machining is the use of minimum quantity lubrication (MQL) machining processes. An MQL machining process is a nearly dry machining process that uses a small quantity of a lubricant, such as vegetable or ester-based oil, mixed with a gas such as air to form an aerosol for lubricating a cutting tool surface during a machining process. MQL machining requires only milliliters of lubricant to be delivered to the cutting edge of the tool per hour as opposed to the gallons of coolant per hour associated with a wet machining process. This significant reduction in the use of lubricant causes an MQL machining process to reduce the exposure of workers to the harmful coolant mists used in wet machining processes, to reduce the amount of materials that must be disposed of following the machining process, and to produce nearly dry and virtually clean metal chips that are much easier to recycle.

Many cutting tools used to carry out an MQL process require internal passages or ducts to supply the air and oil aerosol to the cutting edge of the tool. Such MQL machining processes require that the aerosol flowing through such passages be precisely metered to maintain optimum wetting and lubrication properties, depending on the type of cutting operation. If the aerosol passing through the passages formed in the cutting tool encounters a significant pressure drop or for any other reason is not allowed to flow freely during rotation of the cutting tool the aerosol will reclassify as a larger globule of oil, and the precisely selected lubricity properties of the aerosol will be lost. The resulting loss of lubrication may cause significant damage to the cutting tool, the workpiece, or both.

Additionally, the degree of pressure drop encountered by a lubricating aerosol is often directly affected by the shape and configuration of the fluid conduit through which the lubricating aerosol is caused to flow. Even minor changes in the diameter or curvature of such a fluid conduit can have significant effects on the degree of pressure drop encountered by the lubricating aerosol as it traverses the fluid conduit. Accordingly, it is important that any fluid conduits used to distribute such a lubricating aerosol are precision manufactured to ensure that the lubricating aerosol is delivered to each of the cutting edges of the cutting tool while having a pressure suitable for preventing the separation of the lubricating oil and the air forming the lubricating aerosol.

It would therefore be desirable to create a tool that includes internal fluid conduits that are precision manufactured to militate against causing a pressure drop in a lubricating aerosol traversing the internal fluid conduits during a cutting operation of the tool.

SUMMARY OF THE INVENTION

In accordance with the present invention, a cutting tool having internal fluid conduits that militate against causing a pressure drop in an aerosol passing therethrough is disclosed.

In an embodiment of the current invention, a lubricant distribution device is configured to be coupled to a rotating cutting tool having a plurality of circumferentially spaced cutting surfaces. The lubricant distribution device comprises a main body having a manifold conduit extending along a central rotational axis of the main body and a plurality of lubricant distributing conduits formed in the main body and extending radially outwardly from the manifold conduit. Each of the lubricant distributing conduits is configured to convey a lubricant therethrough and includes an inlet fluidly coupling each of the lubricant distributing conduits to the manifold conduit and an outlet disposed adjacent a corresponding one of the circumferentially spaced cutting surfaces of the cutting tool.

In another embodiment of the current invention, a rotating cutting tool comprises a cylindrical main body including an end face and an outer circumferential surface including a plurality of circumferentially spaced cutting surfaces. The rotating cutting tool further comprises a lubricant distribution cap configured to mate with the end face of the cylindrical main body. The lubricant distribution cap includes a manifold conduit extending along a central rotational axis thereof and a plurality of lubricant distributing conduits extending radially outwardly from the manifold conduit. Each of the lubricant distributing conduits is configured to convey a lubricant therethrough and includes an inlet fluidly coupling each of the lubricant distributing conduits to the manifold conduit and an outlet disposed adjacent a corresponding one of the circumferentially spaced cutting surfaces of the cylindrical main body.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF THE INVENTION

Figure 1:
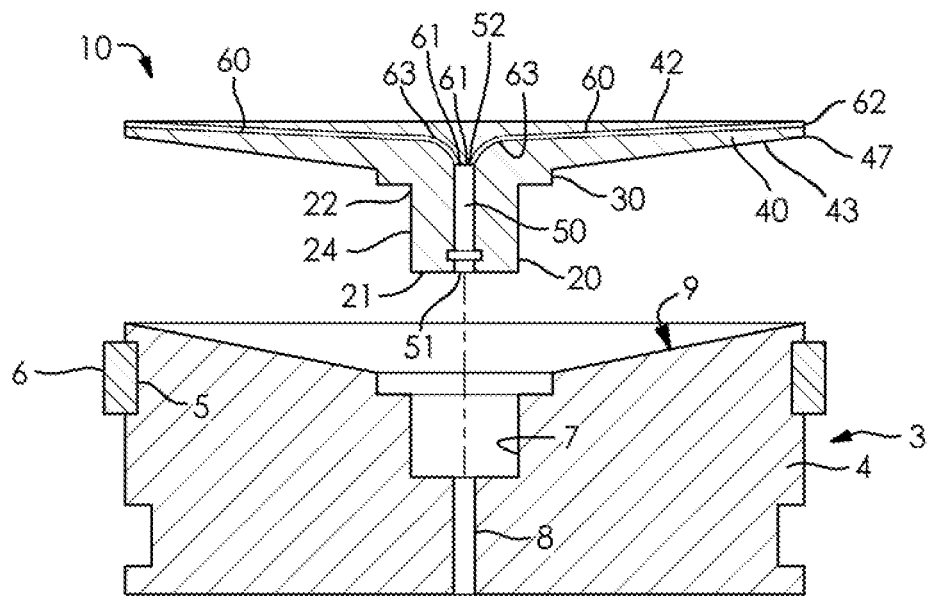
FIG. 1 is a cross-sectional elevational view of a lubricant distribution cap for use with a rotating cutting tool according to the current invention.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Additionally, the dimensions provided in the drawings are merely for purposes of explaining the invention, and are not necessary or critical to operation of the invention unless otherwise stated herein. In respect of the methods disclosed, the steps presented are exemplary in nature, and thus, the order of the steps is not necessary or critical.

Figure 2:
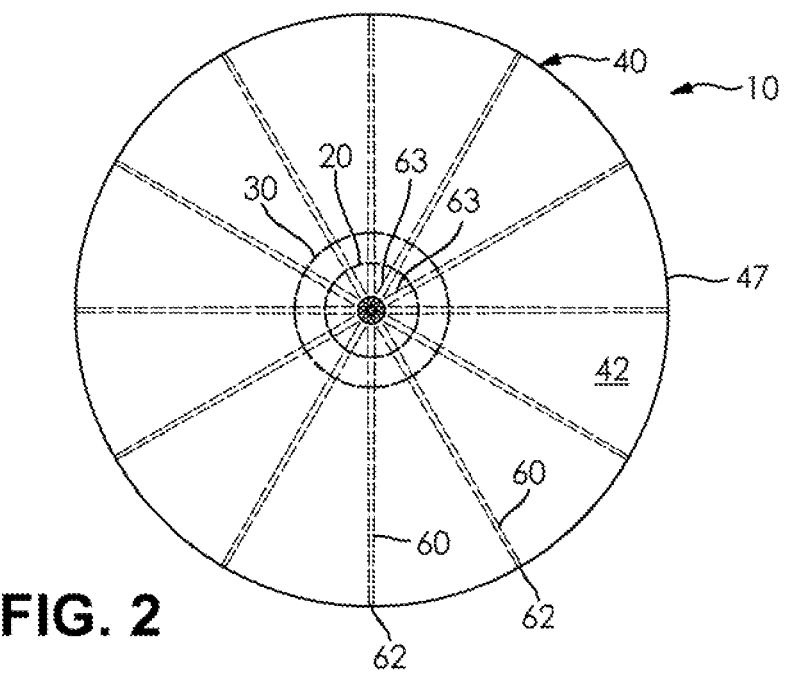
FIG. 2 is a top plan view of the lubricant distribution cap illustrated in FIG. 1.

FIGS. 1 and 2 illustrate a lubricant distribution device in the form of a cap 10 having a main body including a stem 20, a collar 30, and a flanged portion 40. The lubricant distribution cap 10 is used to distribute a lubricant during an MQL machining process. The lubricant may be a lubricating aerosol comprising a gas, such as air, mixed with a lubricant, such as vegetable or ester-based oil, for example. However, it should be understood that any form of lubricating aerosol suitable for use with the lubricant distribution cap 10 may be used without departing from the scope of the present invention.

The lubricant distribution cap 10 is configured for use with a rotating cutting tool 3. The rotating cutting tool 3 may be configured to perform any known machining operation relying on a rotational motion of an associated cutting surface. The rotating cutting tool 3 may for instance be a milling cutting machine, as desired.

The rotating cutting tool 3 may include an annular cutting tool main body 4 having one or more circumferentially spaced recesses or pockets 5 configured to receive a cutting tool cartridge 6 therein. The cutting tool cartridge 6 may have a shape and configuration to be secured within one of the pockets 5 of the cutting tool body 4 and the cutting tool cartridge 6 may be secured into one of the respective pockets 5 by means of a clamping screw (not shown) or other known securing means. The cutting tool cartridge 6 may further be configured for retention of a cutting insert (not shown) for removing material from a workpiece during a machining process. An example of a rotating cutting tool that may be adapted for use with the lubricant distribution cap 10 is disclosed in U.S. Pat. No. 9,266,174, which is hereby incorporated herein by reference in its entirety.

The stem 20 includes a freely disposed first end 21 and a second end 22 coupled to the collar 30. The stem 20 may be substantially cylindrical in shape. An exterior circumferential surface 24 of the stem 20 may include a coupling feature disposed thereon for coupling the lubricant distribution cap 10 to the rotating cutting tool 3. For instance, the rotating cutting tool 3 may include a coupling feature such as a threaded aperture 7 formed along a central rotational axis thereof adapted to receive the stem 20, and the exterior circumferential surface 24 of the stem 20 may include threads formed thereon adapted to mate with the threads of the threaded aperture 7 to secure the lubricant distribution cap 10 to the rotating cutting tool 3. It should be understood, however, that any suitable means of securing the lubricant distribution cap 10 to the rotation cutting tool 3 may be used, as desired.

The lubricant distribution cap 10 further includes a manifold conduit 50 and a plurality of lubricant distributing conduits 60 branching from the manifold conduit 50. The manifold conduit 50 extends through an interior of the stem 20 and the collar 30 along a central rotational axis of the lubricant distribution cap 10. The manifold conduit 50 includes an inlet 51 formed adjacent the first end 21 of the stem 20 and an outlet 52 formed adjacent an interface of the collar 30 and the flanged portion 40. The inlet 51 may be aligned with a corresponding fluid passageway 8 formed in the rotating cutting tool 3 at a base of the threaded aperture 7 when the lubricant distribution cap 10 is securely coupled to the rotating cutting tool 3.

The collar 30 is a cylindrical portion of the lubricant distribution cap 10 interposed between the stem 20 and the flanged portion 40. The collar 30 may be adapted to aid in properly locating the lubricant distribution cap 10 when the lubricant distribution cap 10 is coupled to the rotating cutting tool 3.

The flanged portion 40 is substantially frustoconical and disk-like in shape and is connected to a surface of the collar 30 opposite the stem 20. An exterior surface of the flanged portion 40 includes a substantially circular and planar outer face 42 spaced apart from the collar 30, an angled surface 43 extending outwardly from the collar 30, and a circumferential surface 47 connecting the outer face 42 to the angled surface 43 and arranged substantially parallel to the central rotational axis of the lubricant distribution cap 10. The angled surface 43 may be angled at about 5-10° with respect to the outer face 42, but any suitable angle may be used without departing from the scope of the present invention.

The stem 20, the collar 30, and the flanged portion 40 may be formed to have a rotationally symmetric shape capable of mating with an exterior face 9 of the rotating cutting tool 3 to which the lubricant distribution cap 10 is to be secured. Accordingly, the dimensions and angles of the surfaces forming the lubricant distribution cap 10 may be adapted for use with any number of rotating cutting tools having variable sizes and mating surface configurations without departing from the scope of the present invention.

The outlet 52 of the manifold conduit 50 is fluidly coupled to an inlet 61 of each of the plurality of the lubricant distributing conduits 60. As best shown in FIG. 2, the conduits 60 extend radially outwardly from the central rotational axis of the lubricant distribution cap 10 and toward the circumferential surface 47 of the flanged portion 40. Each of the conduits 60 includes an outlet 62 formed in or adjacent the circumferential surface 47 of the flanged portion 40, resulting in the outlets 62 being circumferentially spaced apart around the periphery of the flanged portion 40. The outlets 62 may also be formed in the outer face 42 or the angled surface 43 of the flanged portion 40 adjacent the circumferential surface 47, as desired, if an alternate angle of delivery of the aerosol is required.

Although the lubricant distribution cap 10 is shown as having twelve (12) of the conduits 60, it should be understood that any number of conduits 60 may be formed in the lubricant distribution cap 10. Rotating cutting tools adapted for use with the lubricant distribution cap 10 may include any number of cutting tool surfaces in need of lubrication during a cutting operation. The number of conduits 60 formed in the lubricant distribution cap 10 is therefore dependent on the number of cutting surfaces formed on the rotating cutting tool to which the lubricant distribution cap 10 is coupled. Accordingly, the outlet 62 of each of the conduits 60 may be formed in the flanged portion 40 of the lubricant distribution cap 10 at a location where each outlet 62 will be disposed adjacent and directed toward a corresponding cutting surface spaced around the periphery of the rotating cutting tool 3.

As best shown in FIG. 1, each of the conduits 60 may include a transitional portion 63 formed adjacent the inlet 61 thereof. The transitional portion 63 causes each of the conduits 60 to turn from extending in a direction substantially parallel to the manifold conduit 50 to a direction substantially perpendicular to the manifold conduit 50. Each of the transitional portions 63 bends around an axis arranged perpendicular to the central rotational axis of the lubricant distribution cap 10. As shown in FIG. 1, the conduits 60 may also be angled with respect to the outer face 42 of the flanged portion 40 as each of the conduits 60 extends from the transitional portion 63 thereof to the circumferential surface 47 of the flanged portion 40. The conduits 60 may angled between 0 and 10 degrees relative to the outer face 42, as desired.

Each of the conduits 60 may have a substantially circular or elliptical cross-sectional shape. The circular or elliptical cross-sectional shape beneficially prevents a fluid flowing through each of the conduits 60 from encountering a significant pressure drop due to lack of sharp edges or corners in each of the conduits 60.

Each of the inlets 61 of the plurality of the conduits 60 may have a common internal cross-sectional flow area, and in the case of a substantially circular conduit 60, a common inner diameter. A total combined flow area of each of the inlets 61 is selected to be substantially equal to a flow area of the manifold conduit 50 at the outlet thereof 52. The equality of the flow area of the outlet 52 of the manifold conduit 50 and the total flow area of the combined inlets 61 of the conduits 60 beneficially prevents a pressure drop from occurring in the aerosol as it enters the plurality of the conduits 60 because a total mass flow of the aerosol is not altered at the transition from the manifold conduit 50 to the plurality of the conduits 60, thereby allowing the aerosol to enter the conduits 60 without undergoing a significant change in velocity and therefore pressure.

Each of the conduits 60 may have a variable internal cross-sectional flow area as each of the conduits 60 extends from the inlet 61 thereof to the outlet thereof 62. In some embodiments, each of the conduits 60 has a substantially constant internal flow area along the transitional portion 63 thereof and a first portion of each of the conduits 60 formed adjacent and extending from the transitional portion 63. A second portion of each of the conduits 60 formed between the first portion and the outlet 62 thereof may include a continuously and gradually decreasing internal flow area. In the case of conduits 60 having a substantially circular cross-sectional shape an inner diameter of each of the conduits 60 may be decreased in a manner wherein the second portion of each of the conduits 60 is substantially frustoconical in shape with a very small degree of inward tapering. In other embodiments, each of the conduits 60 has a continuously and gradually decreasing internal flow area along a length of each of the conduits 60 extending from the transitional portion 63 to the outlet 62 thereof. Still, in other embodiments, each of the conduits 60 may include at least one portion formed between the inlet 61 thereof and the outlet 62 thereof wherein the internal flow area of each of the conduits 60 first increases continuously and gradually before again continuously and gradually decreasing in internal flow area adjacent the outlet 62 thereof.

The decreasing of the internal flow area of each of the conduits 60 adjacent the outlet 62 thereof acts to increase a velocity of the aerosol immediately prior to the aerosol exiting each of the conduits 60. The increased velocity of the aerosol at each of the outlets 62 beneficially promotes the removal of cutting chips adjacent each of the cutting surfaces of the rotating cutting tool 3 that may be generated during the cutting process.

However, the degree and the rate of the decrease in the internal flow area of each of the conduits 60 is controlled to ensure that an excessive pressure drop does not occur within the aerosol due to the increase in velocity of the aerosol when encountering the reduced internal flow area. If a pressure of the aerosol is decreased beyond a specified value, the oil-based lubricant of the aerosol may precipitate out of the aerosol suspension, causing the aerosol being distributed by the outlets 62 of the conduits 60 to not have the desired lubricating properties. Accordingly, the degree, the positioning, and the rate of the decrease in the internal flow area of each of the conduits 60 is selected to promote a desired increase in the velocity of the aerosol adjacent the outlet 62 thereof while also ensuring that the aerosol does not undergo a great enough degree of pressure drop to cause the aerosol to separate before being ejected from each of the conduits 60. Additionally, it should be understood that portions of each of the conduits 60 may similarly be selected to have the increasing internal flow area to similarly control a velocity and a pressure of the aerosol, as desired.

In use, the lubricant distribution cap 10 is first secured to the rotating cutting tool 3 via the securing means formed on the stem 20. Once properly located and secured, the inlet 51 of the manifold conduit 50 is aligned with the fluid passageway 8 formed in the rotating cutting tool 3, allowing for fluid communication between a source of the aerosol and the manifold conduit 50. The rotating cutting tool 3 is caused to rotate about the central rotational axis thereof and the aerosol is continuously fed from a source of the aerosol (not shown) to the manifold conduit 50 of the lubricant distribution cap 10 before being continuously distributed to the plurality of lubricant distributing conduits 60. At least a portion of each of the conduits 60 includes an internal flow area that decreases gradually toward the outlet 62 of each of the conduits 60 in a manner wherein a pressure of the aerosol flowing through each of the conduits 60 does not undergo a significant pressure drop to cause the aerosol to come out of suspension while a velocity of the aerosol is also increased.

The aerosol flows through each of the conduits 60 before being ejected from the lubricant distribution cap 10 via the plurality of outlets 62 distributed around a periphery of the flanged portion 40. Each of the outlets 62 is formed in the lubricant distribution cap 10 such that each of the outlets 62 directs the aerosol to a specified cutting surface similarly spaced around a periphery of the rotating cutting tool 3. The lubricant distribution cap 10 is configured to distribute a preselected quantity of the aerosol to each of the cutting surfaces formed on the rotating cutting tool 3 at a preselected rate, depending on the type of the rotating cutting tool 3 and the desired application. The aerosol is continuously fed to each of the outlets 62 regardless of which of the associated cutting surfaces are engaging an associated workpiece during use of the rotating cutting tool 3. The aerosol may be distributed out of the outlets 62 at a rate of about 250 milliliters per hour, but any suitable rate may be used, as desired.

Figure 3:
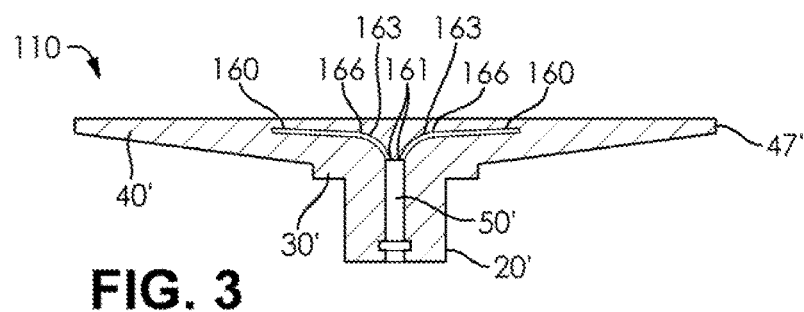
FIG. 3 is a cross-sectional elevational view of a lubricant distribution cap according to another embodiment of the invention.
Figure 4:
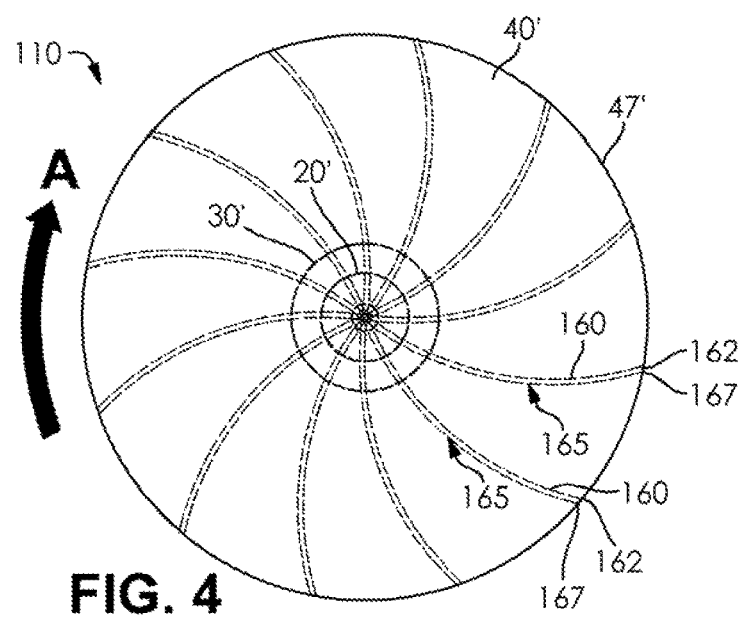
FIG. 4 is a top plan view of the lubricant distribution cap illustrated in FIG. 3.

FIGS. 3 and 4 illustrate a lubricant distribution cap 110 according to another embodiment of the invention. Structure similar to that illustrated in FIGS. 1 and 2 includes the same reference numeral and a prime (') symbol for clarity. The lubricant distribution cap 110 includes a main body including a stem 20', a collar 30', and a flanged portion 40' all having substantially similar structure to the stem 20, the collar 30, and the flanged portion 40 of the lubricant distribution cap 10. However, the lubricant distribution cap 110 includes internal lubricant distributing conduits 160 having a different structure from the lubricant distributing conduits 60 of the lubricant distribution cap 10 illustrated in FIGS. 1 and 2.

Each of the conduits 160 includes an inlet 161 and an outlet 162. In similar fashion to the lubricant distribution cap 10 illustrated in FIG. 1, each of the conduits 160 further includes a transitional portion 163. The transitional portion 163 of each of the conduits 160 causes the aerosol to change from flowing in a direction substantially parallel to the central rotational axis of the lubricant distribution cap 110 to a direction transverse to and extending substantially radially outwardly therefrom. Each of the conduits 160 further includes a bend 165 formed in a portion of each of the conduits 160 disposed radially outwardly from the transitional portion 163 thereof. The bends 165 cause each of the conduits 160 to bend around an axis arranged parallel to the central rotational axis of the lubricant distribution cap 110. Each of the bends 165 includes a first end 166 (shown in FIG. 3) adjacent the transitional portion 163 thereof and a second end 167 (shown in FIG. 4) formed at the outlet 162 thereof. Each of the bends 165 may have a substantially constant radius of curvature extending from the first end 166 to the second end 167 thereof or each of the bends 165 may have a variable radius of curvature extending from the first end 166 to the second end 167 thereof, as desired. As shown in FIG. 4, each of the bends 165 may for example have a large radiused bend 165 wherein the radius of curvature of each of the bends 165 is greater than a radius of the lubricant distribution cap 110. In other embodiments, smaller radii of curvature may be used, as desired.

The bends 165 cause each of the conduits 160 to have an outlet 162 that is directed at least partially in a direction extending radially outwardly and perpendicular to the circumferential surface 47' as well as at least partially in a direction tangential to the circumferential surface 47'. Accordingly, each of the bends 165 allows for the aerosol to be ejected from each of the outlets 162 in a direction that is not entirely perpendicular to the circumferential surface 47' of the flanged portion 40' in contrast to the configuration of the lubricant distribution cap 10 illustrated in FIG. 2. Such a configuration is beneficial when a desired machining process requires that the lubricant be delivered at a specific angle relative to the workpiece or when the removal of the resulting cutting chips requires the chips to be ejected in a desired direction.

Referring to FIG. 4, the rotating cutting tool 3 to which the lubricant distribution cap 110 is to be coupled is caused to rotate in the direction A during use thereof. Accordingly, each of the bends 165 is selected to cause each of the outlets 162 to be directed in a tangential direction opposite of the direction of rotation A of the rotating cutting tool 3. In other words, each of the bends 165 turn in a direction that is opposed to the direction of rotation of the rotating cutting tool 3 as each of the conduits 160 extend from the inlet 161 thereof to the outlet 162 thereof.

The inclusion of a radiused bend 165 in each of the conduits 160 beneficially allows for the aerosol to be changed from being directed in the radial outward direction to being directed at least partially in the tangential direction without undergoing a significant pressure drop due to the aerosol not encountering a sudden or sharp change in direction. Accordingly, the radius of each of the bends 165 is selected to result in each of the outlets 162 being directed at a desired angle relative to the circumferential surface 47' while also being selected to ensure that a pressure drop sufficient to cause the aerosol to fall out suspension does not occur as the aerosol traverses each of the bends 165.

Each of the conduits 160 may further include a variable internal flow area as each of the conduits 160 extends from the inlet 161 thereof to the outlet 162 thereof. More specifically, each of the conduits 160 may be formed to have a continuously and gradually decreasing internal flow area towards the outlet 162 of each of the conduits 160 to promote an increased velocity of the aerosol adjacent each of the associated cutting surfaces of the rotating cutting tool 3. As explained hereinabove, the length and rate of change in the portion of each of the conduits 160 having the decreasing internal flow area may be selected to prevent the aerosol from experiencing an excessive pressure drop capable of bringing the aerosol out of suspension while also causing the aerosol to be ejected at a desired velocity. Additionally, each of the conduits 160 may further include at least a portion thereof having an increasing internal flow area without departing from the scope of the present invention.

In use, the lubricant distribution cap 110 operates in substantially similar fashion to the lubricant distribution cap 10. The rotating cutting tool 3 is caused to rotate in the direction A and the aerosol is delivered through the rotating cutting tool 3 to the lubricant distribution cap 110. The aerosol flows through the manifold conduit (not shown) formed in the stem 20' before being distributed to the plurality of the aerosol distributing conduits 160 formed in the flanged portion 40'. The aerosol then flows through the inlet 161, the transition portion 163, the bend 165, and the outlet 162 of each of the conduits 160 before striking the desired cutting surface. As described hereinabove, the decreasing internal flow area of the conduits 160 and the curvature of the bends 165 aid in directing the aerosol at a desired angle and velocity while also ensuring that the aerosol does not undergo an undesirable degree of pressure drop.

Figure 5:
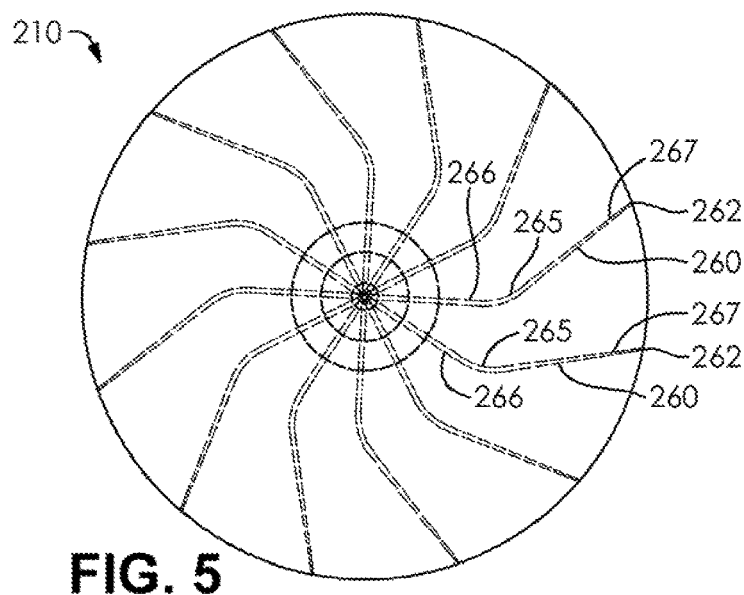
FIG. 5 is a top plan view of a lubricant distribution cap according to another embodiment of the invention.

FIG. 5 illustrates a lubricant distribution cap 210 according to another embodiment of the invention. The lubricant distribution cap 210 is substantially identical to the lubricant distribution cap 110 except the lubricant distribution cap 210 includes lubricant distributing conduits 260 that include each of a first linear portion 266, a second linear portion 267, and a bend 265 connecting the first linear portion 266 to the second linear portion 267. The first linear portion 266 extends from a transitional portion 263 of each of the conduits 260 formed adjacent a central rotational axis of the lubricant distribution cap 210 to the bend 265 thereof. The second linear portion 267 extends from the bend 265 to an outlet 262 of each of the conduits 260. Each of the bends 265 curves around an axis arranged parallel to the central rotational axis of the lubricant distribution cap 210. The bends 265 cause the second linear portion 267 of each of the conduits 260 to be angled with respect to the first linear portion 266 of each of the conduits 260, thereby causing the outlet 262 of each of the conduits 260 to similarly be angled with respect to the first linear portion 266 of each of the conduits 260. The angle formed between the first linear portion 266 and the second linear portion 267 may be between about 30-60°, but it should be understood that other angles may be selected without departing from the scope of the current invention. The bend 265 in each of the conduits 260 is selected to result in a desired angle of ejection of the aerosol flowing through each of the conduits 260 while also preventing the aerosol from losing enough pressure to come out of suspension.

Each of the conduits 260 may further include at least a portion thereof having a variable internal flow area to control for a velocity or pressure of the aerosol as it traverses each of the conduits 260. For example, FIG. 5 illustrates each of the conduits 260 as including a second linear portion 267 having a decreasing internal flow area as the second linear portion 267 extends from the bend 265 to the outlet 262 of each of the conduits 260. In other embodiments, each of the conduits 260 may include portions of both increasing and decreasing internal flow area, as desired.

The internally formed conduits 60, 160, 260 form complex shaped voids in each of the caps 10, 110, 210 having multiple turns and curved or angled surfaces. The unique geometries of the conduits 60, 160, 260, which may include a decreasing internal diameter and various curved portions, require that the lubricant distribution caps 10, 110, 210 be formed using a 3-dimensional additive manufacturing process in place of a traditional manufacturing process, as many traditional manufacturing processes cannot recreate such complex geometries while remaining within desired tolerances. For example, traditional molding or casting operations suffer from issues of excessive porosity, inconsistent fill density, and the inability to create complex shapes during a single manufacturing process. It is also difficult to manufacture complex internal voids using traditional machining processes, and the traditional machining processes further present issues relating to burring and other inconsistencies that must be removed from each of the internal voids following the formation thereof.

The inability for complex internal voids to be manufactured in a single process often results in internal voids that must be formed by the cooperation of multiple parts, which presents additional issues of component alignment, sealing, and the introduction of undesired surfaces and edges that could potentially affect the flow of a fluid encountering the surfaces or edges. Accordingly, the geometries and the precise dimensioning required to create the desired pressure and velocity of the aerosol to be distributed by each of the lubricant distribution caps 10, 110, 210 requires the 3-dimensional additive manufacturing process.

The 3-dimensional additive manufacturing process may for instance be a selective laser sintering process wherein each of the conduits 60, 160, 260 is formed as a void during the selective laser sintering process. The lubricant distribution caps 10, 110, 210 may be formed from any material suitable for a 3-dimensional additive manufacturing process and capable of withstanding the external forces and internal pressures encountered by the lubricant distribution caps 10, 110, 210. One suitable material for forming the lubricant distribution caps 10, 110, 210 may be titanium, for example. Other forms of additive manufacturing processes capable of achieving desired tolerances may similarly be used in place of laser sintering. Additionally, other materials in addition to titanium may be used without departing from the scope of the present invention.

In some embodiments the 3-dimensional additive manufacturing process is used to form only those portions of each of the caps 10, 110, 210 having the conduits 60, 160, 260 formed therein due to the complex geometries of each of the conduits 60, 160, 260. For example, with reference to FIG. 1, the stem 20 and the collar 30 may be formed separately from the flanged portion 40 having the conduits 60 formed therein. The stem 20, the collar 30, and the flanged portion 40 can then be assembled to align the manifold conduit 50 of the stem 20 and the collar 30 with each of the inlets 161 formed in the flanged portion 40. In other embodiments, the entirety of each of the lubricant distribution caps 10, 110, 210 is formed using the 3-dimension additive manufacturing process.

It should also be understood that although the conduits 60, 160, 260 are disclosed as being formed in a lubricant distribution cap 10, 110, 210 that is then coupled to a suitable rotating cutting tool 3, the conduits 60, 160, 260 could also be formed integrally with the rotating cutting tool 3, removing the need for a separately formed lubricant distribution cap 10, 110, 210.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A lubricant distribution device configured to be coupled to a rotating cutting tool having a plurality of circumferentially spaced cutting surfaces, the lubricant distribution device comprising:
a main body having a manifold conduit extending along a central rotational axis of the main body; and
a plurality of lubricant distributing conduits configured to convey a lubricant therethrough, the plurality of lubricant distributing conduits formed in the main body and extending radially outwardly from the manifold conduit, each of the lubricant distributing conduits including an inlet fluidly coupling each of the lubricant distributing conduits to the manifold conduit and an outlet disposed adjacent a corresponding one of the circumferentially spaced cutting surfaces of the cutting tool, wherein each of the lubricant distributing conduits includes a transitional portion wherein a direction of flow of the lubricant changes from flowing parallel to the central rotational axis of the main body to flowing radially outwardly away from the central rotational axis of the main body, wherein each of the transitional portions is arcuate in shape and curves around an axis arranged perpendicular to the central rotational axis of the main body.

2. The lubricant distribution device of claim 1, wherein the main body forms a cap configured to cooperate with an end face of the rotating cutting tool.

3. The lubricant distribution device of claim 2, wherein the cap includes a stem extending along the central rotational axis of the main body and a flanged portion extending radially outwardly from the stem, the flanged portion including the plurality of the lubricant distributing conduits formed therein.

4. The lubricant distribution device of claim 1, wherein at least one portion of each of the lubricant distributing conduits includes a variable internal flow area.

5. The lubricant distribution device of claim 4, wherein the at least one portion of each of the lubricant distributing conduits includes the internal flow area gradually decreasing as each of the lubricant distributing conduits extends in a direction from the inlet thereof to the outlet thereof.

6. The lubricant distribution device of claim 5, wherein the at least one portion of each of the lubricant distributing conduits is disposed adjacent the outlet thereof to increase a velocity of the lubricant when ejected from the outlet.

7. The lubricant distribution device of claim 1, wherein each of the lubricant distributing conduits includes a bend formed therein, the bend curving around an axis arranged parallel to the central rotational axis of the main body.

8. The lubricant distribution device of claim 7, wherein the outlet of each of the lubricant distributing conduits is directed at least partially in a tangential direction of an outer circumferential surface of the main body.

9. The lubricant distribution device of claim 7, wherein each of the lubricant distributing conduits bends in a direction opposite to a direction of rotation of the rotating cutting tool.

10. The lubricant distribution device of claim 7, wherein each of the bends has a constant radius of curvature.

11. The lubricant distribution device of claim 7, wherein a radius of curvature of each of the bends is preselected to militate against a pressure drop of the lubricant as the lubricant flows through each of the lubricant distributing conduits.

12. The lubricant distribution device of claim 1, wherein the lubricant distributing conduits are formed as voids in an additive manufacturing process used to form at least a portion of the main body.

13. The lubricant distribution device of claim 12, wherein the additive manufacturing process is selective laser sintering.

14. The lubricant distribution device of claim 12, wherein the at least a portion of the main body is formed from titanium.

15. The lubricant distribution device of claim 1, wherein the manifold conduit has a first internal flow area in a direction perpendicular to the direction of flow of the lubricant through the manifold conduit, and wherein each of the inlets of the plurality of the lubricant distributing conduits has a second internal flow area in a direction perpendicular to the direction of flow of the lubricant entering each of the inlets of the plurality of the lubricant distributing conduits, wherein the first internal flow area of the manifold conduit is substantially equal to a sum of all of the second internal flow areas of the inlets of the plurality of the lubricant distributing conduits.

16. The lubricant distribution device of claim 1, wherein the lubricant is an aerosol including a gas and a lubricating oil.

17. The lubricant distribution device of claim 1, wherein the manifold conduit and each of the lubricant distributing conduits are formed as voids in an additive manufacturing process used to form at least a portion of the main body.

18. A rotating cutting tool comprising:
a cylindrical main body including an end face and an outer circumferential surface including a plurality of circumferentially spaced cutting surfaces; and
a lubricant distribution cap configured to cooperate with the end face of the cylindrical main body, the lubricant distribution cap including a manifold conduit extending along a central rotational axis thereof and a plurality of lubricant distributing conduits configured to convey a lubricant therethrough and extending radially outwardly from the manifold conduit, each of the lubricant distributing conduits including an inlet fluidly coupling each of the lubricant distributing conduits to the manifold conduit and an outlet disposed adjacent a corresponding one of the circumferentially spaced cutting surfaces of the cylindrical main body, wherein each of the lubricant distributing conduits includes a transitional portion wherein a direction of flow of the lubricant changes from flowing parallel to the central rotational axis of the lubricant distribution cap to flowing radially outwardly away from the central rotational axis of the lubricant distribution cap, wherein each of the transitional portions is arcuate in shape and curves around an axis arranged perpendicular to the central rotational axis of the lubricant distribution cap.

19. The rotating cutting tool of claim 18, wherein the lubricant distributing conduits are formed as voids in an additive manufacturing process used to form at least a portion of the lubricant distribution cap.

* * * * *